(12) United States Patent
Dai et al.

(10) Patent No.: US 12,358,337 B2
(45) Date of Patent: Jul. 15, 2025

(54) ELECTRIC VEHICLE THERMAL MANAGEMENT SYSTEM AND VEHICLE

(71) Applicants: ZHEJIANG GEELY HOLDING GROUP CO., LTD, Zhejiang (CN); NINGBO GEELY AUTOMOBILE RESEARCH & DEVELOPMENT CO. LTD., Zhejiang (CN)

(72) Inventors: Haijiang Dai, Zhejiang (CN); Junbo Xu, Zhejiang (CN); Chao Sun, Zhejiang (CN); Lian Wu, Zhejiang (CN)

(73) Assignees: ZHEJIANG GEELY HOLDING GROUP CO., LTD, Hangzhou (CN); NINGBO GEELY AUTOMOBILE RESEARCH & DEVELOPMENT CO. LTD., Ningbo (CN)

( * ) Notice: Subject to any disclaimer, the term of this patent is extended or adjusted under 35 U.S.C. 154(b) by 118 days.

(21) Appl. No.: 18/031,283

(22) PCT Filed: Jan. 21, 2021

(86) PCT No.: PCT/CN2021/073095
§ 371 (c)(1),
(2) Date: Apr. 11, 2023

(87) PCT Pub. No.: WO2022/155847
PCT Pub. Date: Jul. 28, 2022

(65) Prior Publication Data
US 2023/0406059 A1    Dec. 21, 2023

(51) Int. Cl.
*B60H 3/00* (2006.01)
*B60H 1/00* (2006.01)
(Continued)

(52) U.S. Cl.
CPC .......... *B60H 1/00278* (2013.01); *B60K 11/04* (2013.01); *H01M 10/6567* (2015.04); *B60H 2001/00307* (2013.01)

(58) Field of Classification Search
CPC ................ B60H 1/00278; B60H 11/04; B60H 2001/00307; H01M 10/6567
(Continued)

(56) References Cited

FOREIGN PATENT DOCUMENTS

| CN | 101087084 | * 12/2007 |
|---|---|---|
| CN | 107036833 A | 8/2017 |

(Continued)

OTHER PUBLICATIONS

International Search Report of PCT/CN2021/073095.
Written Opinion of PCT/CN2021/073095.

*Primary Examiner* — Davis D Hwu

(57) ABSTRACT

An electric vehicle thermal management system, comprising a water tank (1), a liquid-gas separator (2), a four-way valve (3), a first water pump (4), a second water pump (5), a battery water jacket (6), an electric appliance water jacket (7) which is simultaneously used for a voltage converter (71) and a vehicle-mounted charger (72), a radiator (8), a heat exchanger main body (91) of a battery cooler (9), an electric motor controller water jacket (10) and/or an electric motor water jacket (11). The four-way valve (3) comprises a first valve port, a second valve port, a third valve port and a fourth valve port. An outlet of the radiator (8) and the water tank (1) are both in communication with the first valve port. The second valve port, the heat exchanger main body (91), the liquid-gas separator (2), the first water pump (4), the battery water jacket (6).

20 Claims, 5 Drawing Sheets

(51) Int. Cl.
*B60K 11/04* (2006.01)
*H01M 10/6567* (2014.01)

(58) Field of Classification Search
USPC .......................................................... 165/42
See application file for complete search history.

(56) References Cited

FOREIGN PATENT DOCUMENTS

| | | | |
|---|---|---|---|
| CN | 109895599 A | 6/2019 |
| CN | 109986960 U | 7/2019 |
| CN | 210436994 U | 5/2020 |
| CN | 111251807 A | 6/2020 |

\* cited by examiner

ELECTRIC VEHICLE THERMAL MANAGEMENT SYSTEM AND VEHICLE

CROSS-REFERENCE TO RELATED APPLICATION

This Application is a national stage application of PCT/CN2021/073095. This application claims priority from PCT Application No. PCT/CN2021/073095, filed Jan. 21, 2021, the content of which is incorporated herein in the entirety by reference.

TECHNICAL FIELD

The present disclosure relates to the field of electric vehicle thermal management, and more particularly to an electric vehicle thermal management system and a vehicle.

BACKGROUND ART

The main function of thermal management system of whole electric vehicle is to ensure the comfort of passenger compartment, control the working temperature of motor, battery, battery controller and motor controller, improve the output efficiency of battery and motor, and extend the battery life. The whole vehicle thermal management system includes an air conditioning system, an electric motor cooling system, a battery cooling system and a battery heating system. The air conditioning system is divided into a heat pump system and a non-heat pump system.

Currently, according to the common thermal management systems of electric vehicles, one type has the heat pump system, and the other type does not have the heat pump system. For the whole vehicle with heat pump system, when heating the passenger compartment in winter, the heat pump system is used to heat the passenger compartment, and the energy consumption is low. The disadvantage is that the working temperature is generally higher than −15° C. When the working temperature is lower than this, other heating methods are needed for supplementation. For the whole vehicle without heat pump system, when it is necessary to heat the passenger compartment in winter, air-heated PTC or water-heated PTC is used to heat the passenger compartment. Due to the high energy consumption of PTC, it will significantly reduce the mileage when it is used.

In addition, there are various battery heat dissipation methods, commonly including natural air cooling, circulating water cooling, direct cooling by cool media and the like. With regard to the natural air cooling method, it has the advantages of cost saving, no need to develop a liquid cooling plate and an external cooling circulation circuit. The disadvantages are that the battery cannot be heated in low temperature conditions in winter. The fast charging function cannot be used. The battery working temperature range cannot be well controlled in high temperature conditions in summer, and the output efficiency of the battery is reduced. In extreme conditions, the output power is also required to be limited, resulting in insufficient torque output of the vehicle and affecting the customer's driving experience.

The electric vehicle thermal management system with the heat pump has high cost and is difficult to be applied in some low cost vehicle models. Meanwhile, the heat pump vehicle type, with the internal condenser/high pressure PTC, has complex piping, difficult layout and high development cost for some small-cabin vehicles.

SUMMARY

In view of the above, the present disclosure has been proposed to provide an electric vehicle thermal management system and a vehicle that overcome or at least partially solve the above problems.

It is an object of a first aspect of the present disclosure to provide an electric vehicle thermal management system that reduces the number of system parts, simplifies the system and reduces costs.

Another object of the present disclosure is to reduce flow resistance and heat loss.

It is a further object of the present disclosure to be able to simplify the system while maintaining functional diversity.

It is an object of a second aspect of the disclosure to provide a vehicle including the thermal management system as described above, capable of performing a plurality of heating and cooling functions.

In particular, according to an aspect of an embodiment of the present disclosure, a thermal management system for an electric vehicle is provided, comprising a water tank, a liquid-gas separator, a four-way valve, a first water pump, a second water pump, a battery water jacket, an electric appliance water jacket which is simultaneously used for a voltage converter and a vehicle-mounted charger, a radiator, a heat exchanger main body of a battery cooler, an electric motor controller water jacket and/or an electric motor water jacket, wherein the four-way valve comprises a first valve port, a second valve port, a third valve port and a fourth valve port; an outlet of the radiator and the water tank are both in communication with the first valve port. The second valve port, the heat exchanger main body, the liquid-gas separator, the first water pump, the battery water jacket and the third valve port are sequentially in communication with each other, and the first water pump is used for pumping a cooling liquid of the liquid-gas separator into the battery water jacket; the fourth valve port, the second water pump, the electric appliance water jacket, the electric motor water jacket and/or the electric motor controller water jacket and an inlet of the radiator are sequentially in communication with each other; and the second water pump is used for pumping a cooling liquid flowing out of the fourth valve port into the electric appliance water jacket.

Optionally, an air passage is further provided between the water tank and the inlet of the radiator.

Optionally, the water tank and the liquid-gas separator are integrally provided.

Optionally, a water temperature sensor is provided between the downstream of the electric appliance water jacket and the upstream of the electric motor water jacket and/or the electric motor controller water jacket.

Optionally, the electric vehicle thermal management system is configured for forming a series cooling circuit or a series heat recovery circuit with the first valve port and the second valve port communicating with each other, the third valve port and the fourth valve port communicating with each other, and both the first water pump and the second water pump operating.

Optionally, the electric vehicle thermal management system is configured for forming an electric motor cooling circuit with the first valve port and the fourth valve port communicating with each other, the second valve port and the third valve port both closed, and the second water pump operating.

Optionally, the electric vehicle thermal management system is configured for forming a small battery-circulation circuit with the second valve port and the third valve port communicating with each other, the first valve port and the fourth valve port both closed, and the first water pump operating.

Optionally, the battery cooler is provided with a cooling liquid inlet communicating with an inlet of the heat exchanger main body, a first cooling liquid outlet communicating with an outlet of the heat exchanger main body, and a second cooling liquid outlet directly communicating with the cooling liquid inlet;

the electric vehicle thermal management system further comprises a PTC heating assembly and a three-way valve, wherein the three-way valve comprises a fifth valve port, a sixth valve port and a seventh valve port; the fifth valve port communicates with the second cooling liquid outlet; the sixth valve port communicates with a water outlet of the PTC heating assembly; and the seventh valve port is connected to the first cooling liquid outlet.

Optionally, the PTC heating assembly comprises:

a third water pump, a high voltage coolant heater and a warm air core body connected in sequence, wherein the third water pump is configured for pumping the cooling liquid from the second cooling liquid outlet into the high voltage coolant heater.

Optionally, the third water pump and the high voltage coolant heater are integrally manufactured.

Optionally, the electric vehicle thermal management system is configured for forming a PTC individual heating battery circuit with the second valve port and the third valve port communicating with each other, the first valve port and the fourth valve port both closed, the sixth valve port and the seventh valve port communicating with each other, the fifth valve port closed, and the first water pump and the third water pump both operating.

Optionally, the electric vehicle thermal management system further comprises:

a blower for generating an airflow that flows into a passenger compartment after being blown towards the warm air core body.

Optionally, the electric vehicle thermal management system is further configured for forming a PTC individual heating passenger compartment circuit with both the third water pump and the blower opened, the fifth valve port and the sixth valve port communicating with each other, and the seventh valve port closed.

In particular, according to another aspect of embodiments of the present disclosure, a vehicle is further provided, comprising a battery, a voltage converter, an on-board charger, an electric motor controller and/or an electric motor, and the electric vehicle thermal management system of any of the above.

The electric vehicle thermal management system of the present disclosure is simplified on the basis of the original thermal management system with a heat pump, eliminates the configuration of the heat pump, preserves the heat recovery function of the electric motor, and can meet the cooling and heating requirements under various operating conditions. Specifically, the expansion kettle of the battery circuit is eliminated. The expansion kettle (i.e. the above-mentioned water tank) and the liquid-gas separator of the connected motor circuit are connected to the battery circuit, so as to meet the requirements for filling the cooling liquid of the battery circuit, reduce the number of system parts and reduce the system cost. An air passage is further provided between the water tank and the inlet of the radiator. That is to say, the water tank also satisfies the air discharge and water supplement requirements of the battery circuit.

Further, the water tank and the liquid-gas separator are integrally provided. That is, the system employs an integrated kettle that incorporates a liquid-gas separation interface. The system parts can be further reduced by using the integrated kettle, making the arrangement more compact and simple.

Further, the present disclosure can further reduce the number of system lines, flow resistance and heat loss by integrating the third water pump and the high voltage coolant heater into one piece.

Further, with fewer parts, the present disclosure is lightweight, and is cost effective compared to the conventional thermal management system with heat pumps and heat recovery. Compared with the conventional thermal management system without heat pumps and heat recovery, the system of the present disclosure has more functions and higher integration, which can make the vehicle travel longer.

The above description is merely an overview of the technical aspects of the present disclosure, which can be carried out in accordance with the contents of the description in order to make the technical aspects of the present disclosure more clearly understood. The detailed description of the present disclosure will be described below to make the above and other objects, features and advantages of the present disclosure more apparent.

The above and other objects, advantages and features of the present disclosure will become more apparent to those skilled in the art from the following detailed description of specific embodiments of the disclosure when taken in conjunction with the accompanying drawings.

BRIEF DESCRIPTION OF THE DRAWINGS

Specific embodiments of the disclosure will be described in detail hereinafter, by way of example and not limitation, with reference to the accompanying drawings. The same reference numbers will be used throughout the drawings to refer to the same or like parts or parts. Those skilled in the art should appreciate that the drawings are not necessarily drawn to scale. In the drawings.

DETAILED DESCRIPTION OF THE DISCLOSURE

Exemplary embodiments of the present disclosure are described in more detail below with reference to the accompanying drawings. While the drawings show exemplary embodiments of the present disclosure, it should be understood that the present disclosure may be embodied in various forms and should not be construed as limited to the embodiments set forth herein. Rather, these embodiments are provided so that this disclosure will be thorough and complete, and will fully convey the scope of the disclosure to those skilled in the art.

Figure 1:
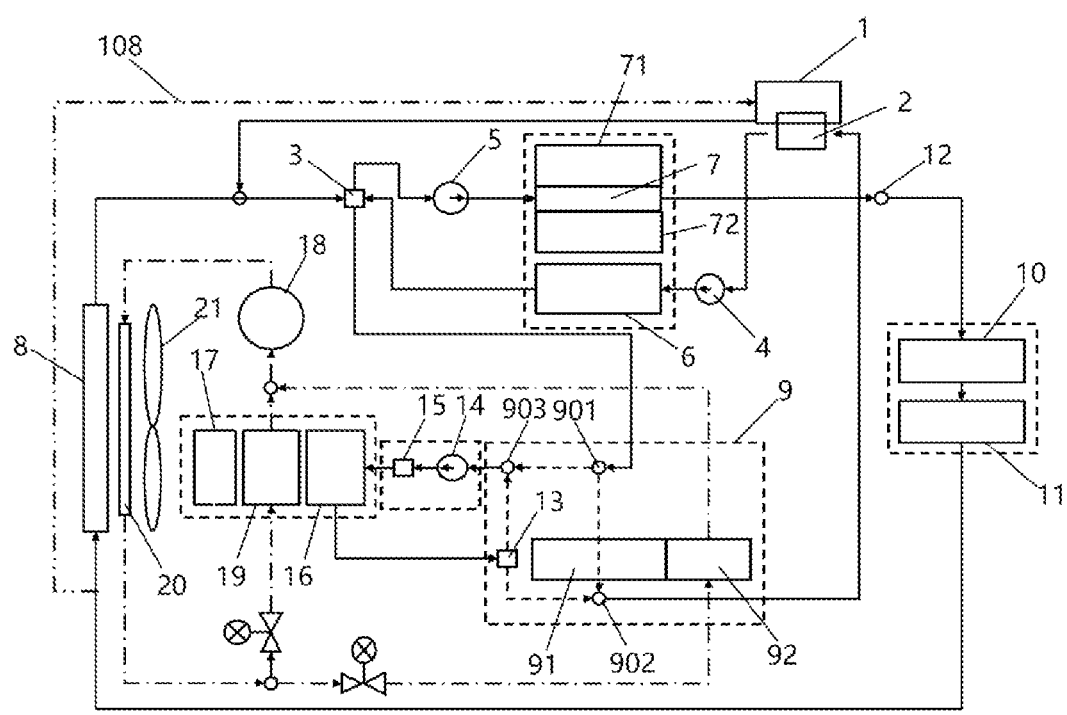
FIG. 1 is a schematic diagram of an electric vehicle thermal management system according to an embodiment of the present disclosure.

FIG. 1 is a schematic diagram of an electric vehicle thermal management system according to an embodiment of the present disclosure. Note that, in the drawings of the present disclosure, the solid line arrows indicate the flow direction of the cooling liquid in the cooling liquid line. The broken line arrows indicate the flow direction of the cooling liquid in the cooling liquid channel inside the battery cooler 9. The dot dash line arrows indicate the flow direction of the cool media, and the double dot dash line arrows indicate the air passage. As shown in FIG. 1, in an embodiment, the electric vehicle thermal management system includes a water tank 1, a liquid-gas separator 2, a four-way valve 3, a first water pump 4, a second water pump 5, a battery water jacket 6, an electric appliance water jacket 7 for both a voltage converter (DCDC) 71 and an on-board OBC 72, a radiator 8, a heat exchanger main body 91 of a battery cooler 9, an electric motor controller water jacket 10, and/or an electric motor water jacket 11. The four-way valve 3 includes a first valve port, a second valve port, a third valve port, and a fourth valve port. The outlet of the radiator 8 and the water tank 1 both communicate with the first valve port. The second valve port, the heat exchanger main body 91, the liquid-gas separator 2, the first water pump 4, the battery water jacket 6 and the third valve port are sequentially in communication with each other. The first water pump 4 is used for pumping a cooling liquid of the liquid-gas separator 2 into the battery water jacket 6. The fourth valve port, the second water pump 5, the electric appliance water jacket 7, the electric motor water jacket 11 and/or the electric motor controller water jacket 10 and the inlet of the radiator 8 are sequentially in communication with each other. The second water pump 5 is used for pumping a cooling liquid flowing out of the fourth valve port into the electric appliance water jacket 7.

The electric vehicle thermal management system of the present embodiment can form at least four operating circuits, specifically as follows.

Figure 2:
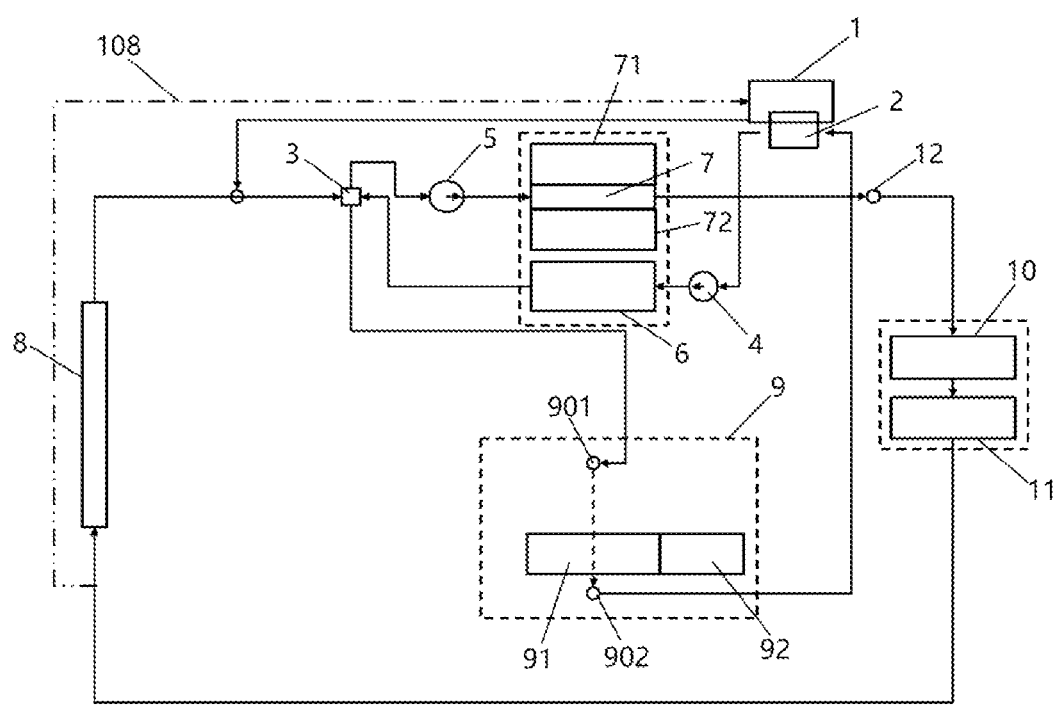
FIG. 2 is a schematic view of a cooling liquid flow direction when the electric vehicle thermal management system is in a first state according to an embodiment of the present disclosure.

FIG. 2 is a schematic view of a cooling liquid flow direction when the electric vehicle thermal management system is in a first state according to an embodiment of the present disclosure. As shown in FIG. 2, when in a first state, the electric vehicle thermal management system controls the first valve port to communicate with the second valve port, and the third valve port and the fourth valve port to be in communication, while the first water pump 4 and the second water pump 5 are controlled to operate. Depending on the current operating conditions of the vehicle, the battery temperature, the temperature of the electric motor and/or electric motor controller, and the ambient temperature, the electric vehicle thermal management system in the first state may form a series cooling circuit or a series heat recovery circuit.

For example, under general conditions, when the battery temperature is between 30° C. and 45° C., and the battery temperature is higher than the temperature of the electric motor and/or the electric motor controller and the ambient temperature, the battery sends a passive cooling request. It can be seen that the temperature of the branch where the electric motor controller water jacket 10 and/or the electric motor water jacket 11 is located is not very high, and the battery of the vehicle has a greater cooling demand, but there is no need to start the battery cooler 9 for cooling. At this time, the electric vehicle thermal management system enters a series cooling mode, and controls the first valve port to be in communication with the second valve port, and the third valve port to be in communication with the fourth valve port. Meanwhile, the operation of the first water pump 4 and the second water pump 5 is controlled, so that the branch where the electric motor controller water jacket 10 and/or the electric motor water jacket 11 is located, the branch where the battery water jacket 6 is located and the branch where the electric appliance water jacket 7 is located are connected in series to form a series cooling circuit. The cooling is performed by the radiator 8.

For another example, under general conditions, when the ambient temperature is 10° C.-22° C., the temperature of the electric motor and/or the electric motor controller is less than 45° C. and higher than the battery temperature, and the battery temperature is higher than 10° C., the battery sends a heating request. At this time, the electric vehicle thermal management system enters into a serial heat recovery mode, and controls the first valve port to communicate with the second valve port, and the third valve port to communicate with the fourth valve port, while the first water pump 4 and the second water pump 5 are controlled to operate, so that the branch where the electric motor controller water jacket 10 and/or the electric motor water jacket 11 are located, the branch where the battery water jacket 6 is located and the branch where the electric appliance water jacket 7 is located are connected in series to form a series heat recovery circuit. The heat recovered from the electric motor controller and/or the electric motor supplies the battery for heating.

Figure 3:
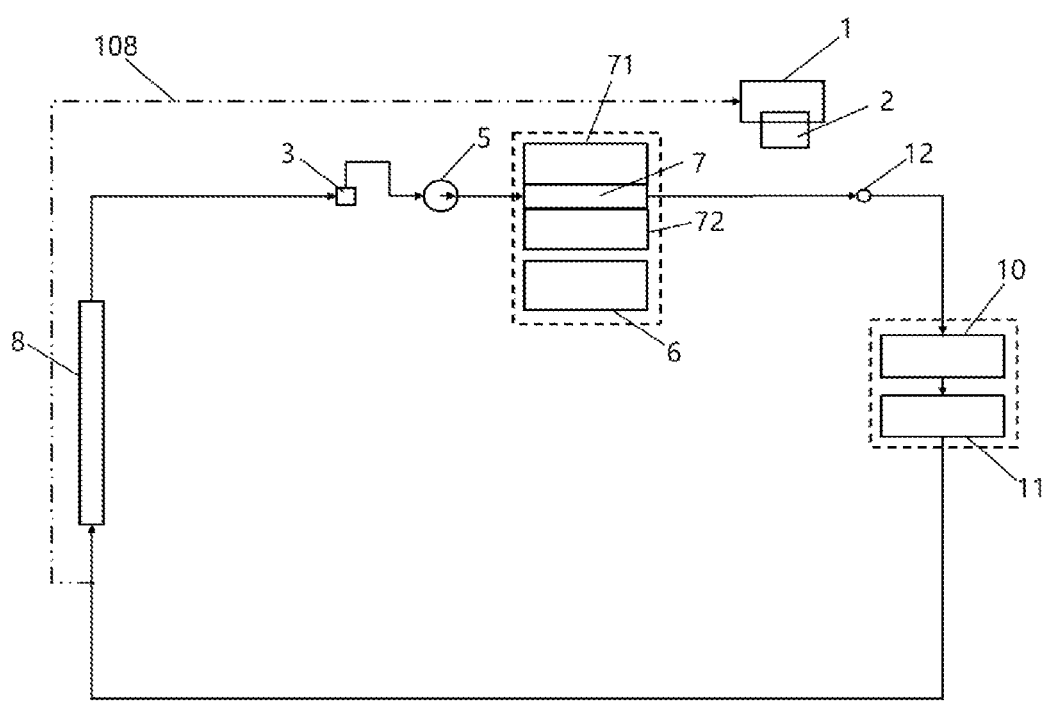
FIG. 3 is a schematic view of a cooling liquid flow direction when the electric vehicle thermal management system is in a second state according to an embodiment of the present disclosure.

FIG. 3 is a schematic view of a cooling liquid flow direction when the electric vehicle thermal management system is in a second state according to an embodiment of the present disclosure. As shown in FIG. 3, when in a second state, the electric vehicle thermal management system controls the first valve port to communicate with the fourth valve port, and both the second valve port and the third valve port to be closed, while the second water pump 5 is controlled to operate to form an electric motor cooling circuit. Under general conditions, when the outlet water temperature of the electric motor is greater than a certain threshold value (for example, 40° C.), the electric vehicle thermal management system enters into an electric motor cooling mode to form a second state, thereby forming an electric motor cooling circuit. At this time, the branch where the electric motor water jacket 11 is located is in communication with the low-temperature radiator 8, thereby achieving the purpose of radiating heat for the electric motor. It should be noted that the embodiment part of the present disclosure defaults to the water pump not being operated in the case that the water pump is not operated or not.

Figure 4:
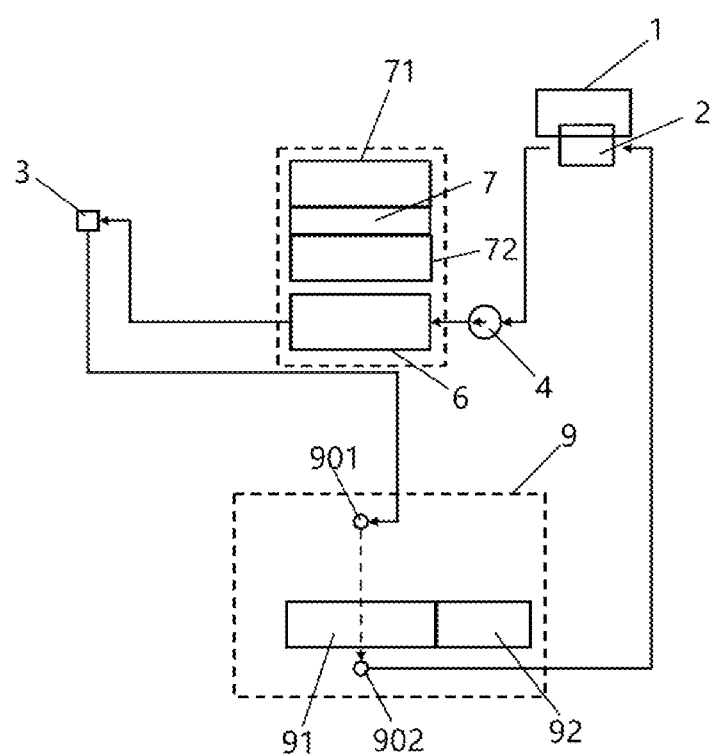
FIG. 4 is a schematic view of a cooling liquid flow direction when the electric vehicle thermal management system is in a third state according to an embodiment of the present disclosure.

FIG. 4 is a schematic view of a cooling liquid flow direction when the electric vehicle thermal management system is in a third state according to an embodiment of the present disclosure. As shown in FIG. 4, the electric vehicle thermal management system may also form a third state, in which the second valve port and the third valve port are controlled to communicate, and both the first valve port and the fourth valve port are closed, while the first water pump 4 is controlled to operate so as to form a small battery-circulation circuit. Under general conditions, when the ambient temperature is less than 22'C, there is no passive cooling or heating requirement for the battery, and the battery temperature is between 10° C. and 30° C. The battery sends a uniform heat request. The electric vehicle thermal management system can enter into a small battery-circulation mode (namely, a third state) to form a small battery-circulation circuit. At this time, the temperature of the electric motor is not used as a trigger condition for entering this mode.

The electric vehicle thermal management system of the present the embodiment is simplified on the basis of the original thermal management system with a heat pump, eliminates the configuration of the heat pump, preserves the heat recovery function of the electric motor, and can meet the cooling and heating requirements under various operating conditions. Specifically, the expansion kettle of the battery circuit is eliminated. The expansion kettle (i.e. the above-mentioned water tank 1) and the liquid-gas separator 2 of the connected motor circuit are connected to the battery circuit, so as to meet the requirements for filling the cooling liquid of the battery circuit, reduce the number of system parts and reduce the system cost.

In a further embodiment, as shown in FIG. 1, an air passage 108 is provided between the water tank 1 and the inlet of the radiator 8. That is, the water tank 1 also satisfies the air discharge and water supplement requirements of the battery circuit.

Optionally, the water tank 1 and the liquid-gas separator 2 are integrally provided. That is, the system employs an integrated kettle that incorporates a liquid-gas separation interface. The system parts can be further reduced by using the integrated kettle, making the arrangement more compact and simple.

In an embodiment, as shown in FIG. 1, a water temperature sensor 12 is provided between the downstream of the electric appliance water jacket 7 and the upstream of the electric motor water jacket 11 and/or the electric motor controller water jacket 10. The temperature collected by the water temperature sensor can be used to judge whether the temperature downstream of the electric appliance water jacket 7 exceeds a preset threshold value, thereby facilitating the accuracy of control. Of course, the electric vehicle thermal management system would also be provided with various temperature sensors at different positions to obtain the temperatures of various parts in real time. For example, temperature sensors are provided on the electric motor body and at the water inlet of the battery water jacket 6.

As shown in FIG. 1, in a further embodiment, the battery cooler 9 is provided with a cooling liquid inlet 901 communicating with an inlet of the heat exchanger main body 91, a first cooling liquid outlet 902 communicating with an outlet of the heat exchanger main body 91, and a second cooling liquid outlet 903 directly communicating with the cooling liquid inlet 901. The electric vehicle thermal management system further includes a PTC heating assembly and a three-way valve 13. The three-way valve 13 includes a fifth valve port, a sixth valve port and a seventh valve port. The fifth valve port communicates with the second cooling liquid outlet 903. The sixth valve port communicates with a water outlet of the PTC heating assembly. The seventh valve port communicates with the first cooling liquid outlet 902. Optionally, the PTC heating assembly includes a third water pump 14, a high voltage coolant heater (HVCH) 15 and a warm air core body 16 connected in series. The third water pump 14 serves to pump the cooling liquid from the second cooling liquid outlet 903 into the high voltage coolant heater 15. The warm air core body 16 serves to exchange heat between the heated cooling liquid flowing out of the high voltage coolant heater 15 and the outside air.

Figure 5:
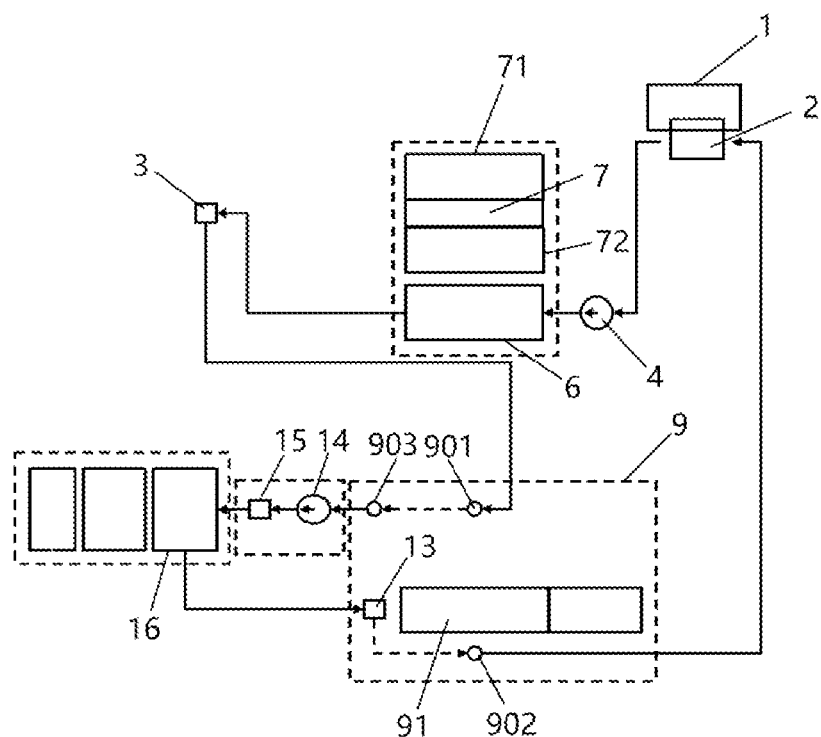
FIG. 5 is a schematic view of a cooling liquid flow direction when the electric vehicle thermal management system is in a fourth state according to an embodiment of the present disclosure.

FIG. 5 is a schematic view of a cooling liquid flow direction when the electric vehicle thermal management system is in a fourth state according to an embodiment of the present disclosure. As shown in FIG. 5, when in a fourth state, the electric vehicle thermal management system of the present embodiment controls the second valve port to communicate with the third valve port and the first valve port and the fourth valve port to be closed, the sixth valve port to communicate with the seventh valve port and the fifth valve port to be closed, and both the first water pump 4 and the third water pump 14 to operate, thereby forming a PTC individual heating battery circuit. Under general conditions, when the ambient temperature is less than 10° C., the battery temperature is less than 10° C., the battery sends a heating request. At this time, the customer does not have a demand for starting the warm air. The electric vehicle thermal management system can enter into a PTC single heating battery mode (at this time, the electric vehicle thermal management system is in a fourth state), controlling the second valve port and the third valve port to be in communication and both the first valve port and the fourth valve port to be closed, the sixth valve port and the seventh valve port to be in communication and the fifth valve port to be closed, and both the first water pump 4 and the third water pump 14 to operate, thereby forming a PTC individual heating battery circuit. This typically occurs at low temperature fast charge conditions. In this condition, if the PTC heating assembly is directly connected in series with the branch of the battery water jacket 6, there is a risk of thermal runaway. The liquid-gas separation part (namely, the liquid-gas separator 2) of the integrated kettle is connected in series between the battery water jacket 6 and the PTC heating assembly to mix water. When the PTC heating assembly is overheated, the temperature of water entering the battery pack can be reduced to reduce the risk.

Further, as shown in FIG. 1, the electric vehicle thermal management system further includes a blower 17 for generating an airflow that flows into a passenger compartment after being blown towards the warm air core body 16. Under general conditions, when the ambient temperature is less than −5° C. and the battery temperature is less than 10° C., the battery makes a passive heating request, and the customer turns on the warm air. The blower 17 can be controlled to turn on under the premise of entering the PTC individual heating battery mode, i.e., forming a mode in which the PTC heats the battery and the passenger compartment at the same time. Meanwhile, the temperature of the electric motor does not act as a trigger condition for whether to enter the mode in which the PTC heats the battery and the passenger compartment at the same time.

The blower 17 is provided to control whether the heat generated by the PTC heating assembly is used to heat the battery alone or the battery and passenger compartment simultaneously. When the blower 17 is turned off, the condition of separately heating the battery in FIG. 5 is established. When the blower 17 is turned on, the heat of the PTC heating assembly can be simultaneously blown to the passenger compartment, thereby simultaneously heating the battery and the passenger compartment.

Figure 6:
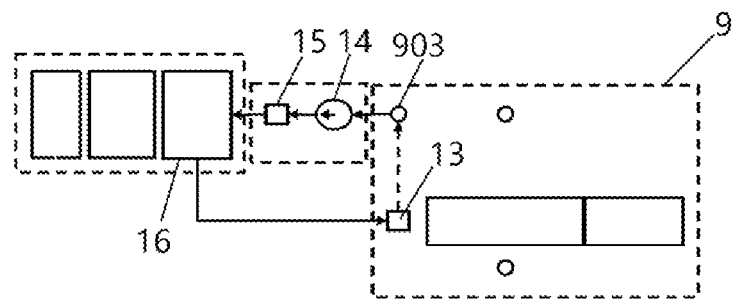
FIG. 6 is a schematic view of a cooling liquid flow direction when the electric vehicle thermal management system is in a fifth state according to an embodiment of the present disclosure.

FIG. 6 is a schematic view of a cooling liquid flow direction when the electric vehicle thermal management system is in a fifth state according to an embodiment of the present disclosure. As shown in FIG. 6, when in a fifth state, the electric vehicle thermal management system controls the third water pump 14 and the blower 17 to be turned on, the fifth valve port to communicate with the sixth valve port, and the seventh valve port to be closed so as to form a PTC individual heating passenger compartment circuit. Under general conditions, for a vehicle with a non-heat pump configuration, when the ambient temperature is less than 10° C., the customer turns on the warm air, and there is no heating request from the battery. It can enter into the PTC individual heating passenger compartment mode (at this time, the electric vehicle thermal management system is in the fifth state) to turn on the third water pump 14 and the blower 17, the fifth valve port and the sixth valve port to be in communication and the seventh valve port to be closed to form a PTC individual heating passenger compartment circuit. At this time, the temperature of the electric motor is not used as a trigger condition for entering this mode. For a vehicle with heat pump configuration, under general conditions, when the ambient temperature is less than −10° C., the heat pump heating mode is off, and the customer turns on the warm air. It can enter into the PTC single heating passenger compartment mode. When the ambient temperature is less than 0° C., the customer turns on warm air, and the heating capacity of heat pump system is insufficient. It can enter into the PTC individual heating passenger compartment mode. In the PTC individual heating passenger compartment mode, rapid heating is required when the temperature of the passenger compartment is low. The PTC individual heating passenger compartment circuit is formed by only connecting a small circulation circuit of the PTC heating assembly itself, with short lines arranged and reduced heat loss. The blower 17 sends the heat of the heated cooling liquid in the warm air core body 16 to the passenger compartment, so that the passenger compartment can be rapidly warmed up.

In some embodiments of the present disclosure, the third water pump 14 and the high pressure liquid heater 15 are integrally manufactured. By integrating the third water pump 14 and the high voltage coolant heater 15 into one piece, the number of system lines, flow resistance and heat loss can be further reduced.

With fewer parts, the present disclosure is lightweight, and is cost effective compared to the conventional thermal management system with heat pumps and heat recovery. Compared with the conventional thermal management system without heat pumps and heat recovery, the system of the present disclosure has more functions and higher integration, which can make the vehicle travel longer.

As shown in FIG. 1, the electric vehicle thermal management system of the present disclosure further includes a cool media circuit, namely, the circuit composed of an external evaporator 92, an air-conditioning compressor 18, an internal evaporator 19, a condenser 20 and a fan 21 in FIG. 1. The operation principle of this part of the circuit is similar to that of a common non-heat pump system. The battery is cooled by the battery cooler 9, which will not be described again.

The present disclosure also provides a vehicle including a battery, a voltage converter, an on-board charger, an electric motor controller and/or an electric motor, and an electric vehicle thermal management system in any of the embodiments described above.

The electric vehicle thermal management system of the vehicle is simplified on the basis of the original thermal management system with a heat pump, eliminates the configuration of the heat pump, preserves the heat recovery function of the electric motor, and can meet the cooling and heating requirements under various operating conditions. Specifically, the expansion kettle of the battery circuit is eliminated. The expansion kettle (i.e. the above-mentioned water tank 1) and the liquid-gas separator 2 of the connected motor circuit are connected to the battery circuit, so as to meet the requirements for filling the cooling liquid of the battery circuit, reduce the number of system parts and reduce the system cost.

Thus, those skilled in the art will appreciate that while exemplary embodiments of the present disclosure have been shown and described in detail herein, many other variations and modifications may be made directly in accordance with the present disclosure without departing from the spirit and scope of the disclosure. Accordingly, the scope of the present disclosure should be understood and interpreted to cover all such other variations or modifications.

What is claimed is:

1. A thermal management system for an electric vehicle, comprising a water tank, a liquid-gas separator, a four-way valve, a first water pump, a second water pump, a battery water jacket, an electric appliance water jacket which is simultaneously used for a voltage converter and a vehicle-mounted charger, a radiator, a heat exchanger main body of a battery cooler, an electric motor controller water jacket and/or an electric motor water jacket, wherein the four-way valve comprises a first valve port, a second valve port, a third valve port and a fourth valve port; an outlet of the radiator and the water tank are both in communication with the first valve port; the second valve port, the heat exchanger main body, the liquid-gas separator, the first water pump, the battery water jacket and the third valve port are sequentially in communication with each other, and the first water pump is used for pumping a cooling liquid of the liquid-gas separator into the battery water jacket; the fourth valve port, the second water pump, the electric appliance water jacket, the electric motor water jacket and/or the electric motor controller water jacket and an inlet of the radiator are sequentially in communication with each other; the second water pump is used for pumping a cooling liquid flowing out of the fourth valve port into the electric appliance water jacket; and the battery cooler is provided with a cooling liquid inlet communicating with an inlet of the heat exchanger main body, a first cooling liquid outlet communicating with an outlet of the heat exchanger main body, and a second cooling liquid outlet directly communicating with the cooling liquid inlet.

2. The thermal management system for the electric vehicle according to claim 1, wherein an air passage is further provided between the water tank and the inlet of the radiator.

3. The thermal management system for the electric vehicle according to claim 1, wherein the water tank and the liquid-gas separator are integrally provided.

4. The thermal management system for the electric vehicle according to claim 1, wherein a water temperature sensor is provided between the downstream of the electric appliance water jacket and the upstream of the electric motor water jacket and/or the electric motor controller water jacket.

5. The thermal management system for the electric vehicle according to claim 1, wherein the electric vehicle thermal management system is configured for forming a series cooling circuit or a series heat recovery circuit with the first valve port and the second valve port communicating with each other, the third valve port and the fourth valve port communicating with each other, and both the first water pump and the second water pump operating.

6. The thermal management system for the electric vehicle according to claim 1, wherein the electric vehicle thermal management system is configured for forming an electric motor cooling circuit with the first valve port and the fourth valve port communicating with each other, the second valve port and the third valve port both closed, and the second water pump operating.

7. The thermal management system for the electric vehicle according to claim 1, wherein the electric vehicle thermal management system is configured for forming a small battery-circulation circuit with the second valve port and the third valve port communicating with each other, the first valve port and the fourth valve port both closed, and the first water pump operating.

8. The thermal management system for the electric vehicle according to claim 1, wherein:
the electric vehicle thermal management system further comprises a PTC heating assembly and a three-way valve, wherein the three-way valve comprises a fifth valve port, a sixth valve port and a seventh valve port; the fifth valve port communicates with the second cooling liquid outlet; the sixth valve port communicates with a water outlet of the PTC heating assembly; and the seventh valve port is connected to the first cooling liquid outlet.

9. The thermal management system for the electric vehicle according to claim 8, wherein the PTC heating assembly comprises:
a third water pump, a high voltage coolant heater and a warm air core body connected in sequence, wherein the third water pump is configured for pumping the cooling liquid from the second cooling liquid outlet into the high voltage coolant heater.

10. The thermal management system for the electric vehicle according to claim 9, wherein the third water pump and the high voltage coolant heater are integrally manufactured.

11. The thermal management system for the electric vehicle according to claim 9, wherein the electric vehicle thermal management system is configured for forming a PTC individual heating battery circuit with the second valve port and the third valve port communicating with each other, the first valve port and the fourth valve port both closed, the sixth valve port and the seventh valve port communicating with each other, the fifth valve port closed, and the first water pump and the third water pump both operating.

12. The thermal management system for the electric vehicle according to claim 9, further comprising:
a blower fan for generating an airflow that flows into a passenger compartment after being blown towards the warm air core body.

13. The thermal management system for the electric vehicle according to claim 12, wherein the electric vehicle thermal management system is further configured for forming a PTC individual heating passenger compartment circuit with both the third water pump and the blower opened, the fifth valve port and the sixth valve port communicating with each other, and the seventh valve port closed.

14. A vehicle, comprising a battery, a voltage converter, an on-board charger, an electric motor controller and/or an electric motor, and a electric vehicle thermal management system comprising a water tank, a liquid-gas separator, a four-way valve, a first water pump, a second water pump, a battery water jacket, an electric appliance water jacket which is simultaneously used for a voltage converter and a vehicle-mounted charger, a radiator, a heat exchanger main body of a battery cooler, an electric motor controller water jacket and/or an electric motor water jacket, wherein the four-way valve comprises a first valve port, a second valve port, a third valve port and a fourth valve port; an outlet of the radiator and the water tank are both in communication with the first valve port; the second valve port, the heat exchanger main body, the liquid-gas separator, the first water pump, the battery water jacket and the third valve port are sequentially in communication with each other, and the first water pump is used for pumping a cooling liquid of the liquid-gas separator into the battery water jacket; the fourth valve port, the second water pump, the electric appliance water jacket, the electric motor water jacket and/or the electric motor controller water jacket and an inlet of the radiator are sequentially in communication with each other; the second water pump is used for pumping a cooling liquid flowing out of the fourth valve port into the electric appliance water jacket; and the battery cooler is provided with a cooling liquid inlet communicating with an inlet of the heat exchanger main body, a first cooling liquid outlet communicating with an outlet of the heat exchanger main body, and a second cooling liquid outlet directly communicating with the cooling liquid inlet.

15. The vehicle according to claim 14, wherein the electric vehicle thermal management system is configured for forming a series cooling circuit or a series heat recovery circuit with the first valve port and the second valve port communicating with each other, the third valve port and the fourth valve port communicating with each other, and both the first water pump and the second water pump operating.

16. The vehicle according to claim 14, wherein the electric vehicle thermal management system further comprises a PTC heating assembly and a three-way valve, wherein the three-way valve comprises a fifth valve port, a sixth valve port and a seventh valve port; the fifth valve port communicates with the second cooling liquid outlet; the sixth valve port communicates with a water outlet of the PTC heating assembly; and the seventh valve port is connected to the first cooling liquid outlet.

17. The vehicle according to claim 16, wherein the PTC heating assembly comprises:
a third water pump, a high voltage coolant heater and a warm air core body connected in sequence, wherein the third water pump is configured for pumping the cooling liquid from the second cooling liquid outlet into the high voltage coolant heater.

18. The vehicle according to claim 17, wherein the third water pump and the high voltage coolant heater are integrally manufactured.

19. The vehicle according to claim 17, wherein the electric vehicle thermal management system is configured for forming a PTC individual heating battery circuit with the second valve port and the third valve port communicating with each other, the first valve port and the fourth valve port both closed, the sixth valve port and the seventh valve port communicating with each other, the fifth valve port closed, and the first water pump and the third water pump both operating.

20. The vehicle according to claim 14, wherein the electric vehicle thermal management system is configured for forming an electric motor cooling circuit with the first valve port and the fourth valve port communicating with each other, the second valve port and the third valve port both closed, and the second water pump operating.

* * * * *